(No Model.)

G. J. ORTNER.
ELECTRIC BATTERY ELEMENT.

No. 561,810.  Patented June 9, 1896.

WITNESSES:

INVENTOR
G. J. Ortner.
BY
ATTORNEYS.

UNITED STATES PATENT OFFICE.

GEORGE J. ORTNER, OF PUEBLO, COLORADO.

ELECTRIC-BATTERY ELEMENT.

SPECIFICATION forming part of Letters Patent No. 561,810, dated June 9, 1896.

Application filed February 18, 1896. Serial No. 579,716. (No model.)

*To all whom it may concern:*

Be it known that I, GEORGE J. ORTNER, of Pueblo, in the county of Pueblo and State of Colorado, have invented certain new and useful Improvements in Electric-Battery Elements, of which the following is a full, clear, and exact description.

This invention relates particularly to zinc elements for a battery, and the object is to so construct the element that there will be practically no waste of the zinc, and, further, to so construct the element that several may be packed closely together for transportation.

I will describe a battery element embodying my invention and then point out the novel features in the appended claim.

Reference is to be had to the accompanying drawings, forming a part of this specification, in which similar characters of reference indicate corresponding parts in both the figures.

Figure 1:
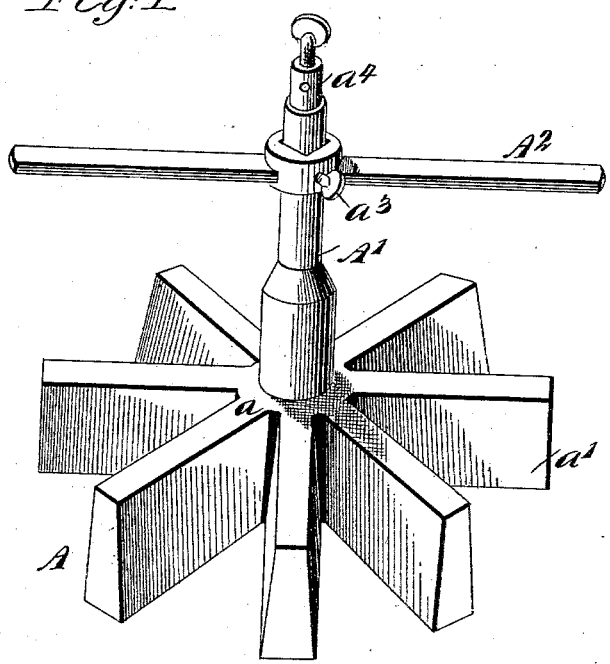
Figure 2:
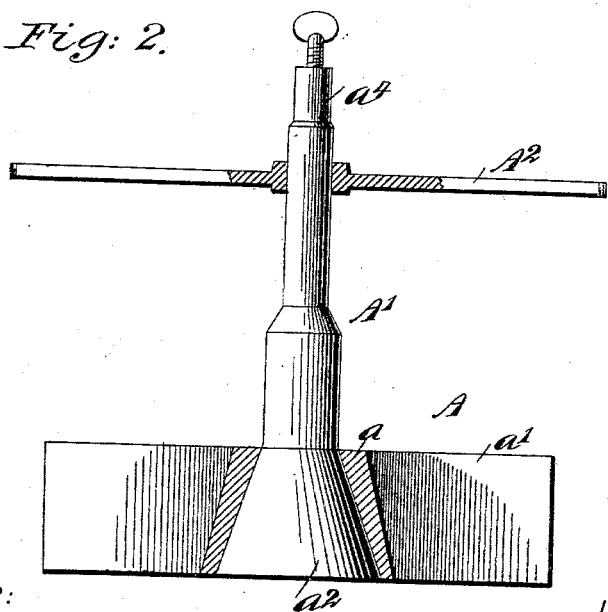

Figure 1 is a perspective view of a battery element embodying my invention, and Fig. 2 is a sectional view thereof.

Referring to the drawings, A designates a zinc element comprising a tubular hub portion $a$ and arms $a'$, extended therefrom. A' is a supporting-stem for the element, consisting of a metal which provides a good conductor, but not subject to destruction by the chemicals in a battery. I find amalgamated zinc suitable for this stem. The stem is designed to be removably engaged by the zinc element and to support said element in the battery-jar. It is here shown as having a downwardly and outwardly flared lower end $a^2$, designed to engage in a correspondingly-shaped opening in the hub $a$ of the element. A cross-bar $A^2$, designed to rest its ends on the upper edge of a battery-jar to support the stem and element, has an opening in its center, through which the stem is adjustable, and a set-screw $a^3$, passing through the bar, serves to hold the stem as adjusted. The upper end of the stem is provided with a binding-post $a^4$ for a line-wire.

It will be seen by the construction described that when an element is nearly eaten away a new one may be placed on the stem over the old element, so that the old element may serve until entirely destroyed by the battery chemicals. As the stem has a straight cylindrical portion above the tapered portion of a diameter equal to the diameter of the smaller end of the opening through the hub, it is obvious that said straight cylindrical portion will form a guide for a new element placed over an old one and prevent the new element from moving laterally. As the stem is removable, it is obvious that by removing the stems several elements may be strung on a rod and closely packed for transportation.

Having thus described my invention, I claim as new and desire to secure by Letters Patent—

A zinc element for a battery, comprising a hub portion having a tapered opening, an amalgamated-zinc supporting-stem having a tapered portion at its lower end having a length substantially equal to the length of the opening in the element-hub and having a straight cylindrical portion above the tapered portion of a diameter equal to the smaller end of the opening through the hub, substantially as specified.

GEORGE J. ORTNER.

Witnesses:
WILLIAM LEWIS,
FRED. M. KLINE.